Patented Apr. 13, 1926.

1,580,999

UNITED STATES PATENT OFFICE.

HENRY W. DAHLBERG, OF DENVER, COLORADO.

PROCESS OF MANUFACTURING YEAST.

No Drawing. Application filed June 8, 1922. Serial No. 566,857.

*To all whom it may concern:*

Be it known that I, HENRY W. DAHLBERG, a citizen of the United States, residing at Denver, in the county of Denver and State of Colorado, have invented new and useful Improvements in Processes of Manufacturing Yeast, of which the following is a specification.

This invention relates to the production of bakers' yeast and pertains particularly to the preparation of a yeast mash which will have the proper proportion of organic nitrogenous material and sugar to serve as nourishment and food for yeast.

In the manufacture of yeast it is known that yeast cells develop most satisfactorily if the mash in which fermentation is to be effected contains sugar and nitrogenous matter. It is also known that mashes formed from saccharine material and used in the manufacture of yeast are improved by the addition of nitrogenous matter. This latter is particularly noticeable in cases where the mash has been prepared from cane sugar molasses or syrups which are known to contain too small an amount of nitrogenous matter.

The present invention is directed to the improvement of the mash material and conditions of fermentation to effect an increased yield of yeast. This improvement is brought about by the addition to the mash of a particular material which contains organic nitrogenous matter, mineral salts, and a small percentage of sugar, the amount of this latter being too small to be recovered commercially. The particular material is the waste water produced in the process of desugarizing beet molasses and syrups after all of the available sugar content has been recovered by precipitation as a saccharate such as calcium, strontium, or barium saccharate. There may remain in the waste water some sugar in quantities too small to be recovered. An example of such a waste water is that known as "Steffen waste water," produced during the process of desugarizing beet molasses by means of calcium oxide. By utilizing this waste water in the proper proportions in the preparation of a yeast mash two advantageous results are obtained, first, an increased yield of yeast due to the nourishment furnished to the yeast cells by the organic nitrogen compounds of the waste water, and secondly, the possibly remaining sugar content of the waste water is utilized by the yeast in its growth. Thus the otherwise non-recoverable sugar in the waste water is not wasted but is consumed during the growth of the yeast. Being essentially a yeast nutrient, the waste water may be used in conjunction with any yeast mash containing saccharine material, such as beet molasses, cane molasses, grain, malt or sugar in any form. Most of these materials are deficient in organic nitrogen, particularly in that group of nitrogenous compounds classified as "amino nitrogen," and as these compounds are essential for maximum yeast growth, the addition of waste water to the mash in the proper proportions gives an increased yield of yeast. Amino nitrogen is distinguished by the presence of $NH_2$, which represents the amino group of compounds containing it. The general group includes "amines" of which methyl amine is an example, "aminoacids," of which glutamic acid is an example, and "amides," of which glutamine is an example. The chief nitrogenous compounds in waste water, which are classified as "amino nitrogen" are glutamic acid, glutamine and asparagine. "Amino nitrogen" is that form of nitrogen, determined by the Van Slyke method, which is the method of the Association of Official Agricultural Chemists described on pages 216–19, inclusive, of their "Methods of Analysis," 1921 edition, second printing.

The process is particularly applicable to the manufacture of yeast from molasses, whether derived from the sugar cane or sugar beet. The following procedure may be used for treating a mash made from molasses or syrups. First, beet molasses is desugarized by the addition of powdered lime added to a cold dilute molasses solution. The major portion of the sugar is precipitated as a calcium saccharate, and the remainder of the material comprises the waste water previously described. The saccharate and the waste water are separated, the saccharate being further treated to obtain the sugar, and the waste water being used in the remainder of the present process in accordance with the following description. The yeast mash is prepared in a manner known by diluting molasses with water to the desired density. Waste water is then added to the mash in such proportions that the ratio of sugar to amino nitrogen present is in the ratio of 100 parts of sugar to at least as much as 0.4 to 1.0 parts of amino nitrogen, as determined by analysis. This ratio has been found to be the most desirable for the maximum growth of yeast, although an excess of amino nitrogen is not harmful. The amino nitrogen is determined by means of the Van Slyke apparatus, or any well known standard method. After thorough mixing, the mash is brought to the desired degree of acidity and to the proper temperature, seed yeast added, and the mash vigorously aerated for a period of 12 to 24 hours at a temperature of approximately 25° C. to 30° C. Fermentation begins very soon after the addition of the seed yeast. The yeast cells grow vigorously and during their growth assimilate from 70% to 90% of the amino nitrogen present in the mash together with other assimilable nitrogen present.

The effect of the waste water is most marked when cane molasses is used as the raw material for yeast manufacture. Cane molasses is very low in amino nitrogen, and the increased yield of yeast is very noticeable when this deficiency is made up by the use of waste water.

From the foregoing it will be obvious that the present invention provides for the use of the particular materials taken from sugar beets and thus identified as sugar beet extractive matter. The waste water which contains this extractive matter is that material remaining after sugar has been removed from sugar beet syrups which prior to the extraction contain both the extracted matter and recoverable amounts of sugar. Aside from the value of the process in the development of yeast, the invention serves also to dispose of a waste material of sugar factories which has been considered a nuisance and objected to because of the pollution of streams.

I claim:

1. In the process of making bakers' yeast with the use of waste water as a yeast nutrient, the steps which consist in adding to a mash which is deficient in yeast food and as a yeast nutrient therefor the waste water resulting from the desugarizing of beet molasses when sugar is removed therefrom as an alkaline earth metal saccharate by addition of an alkaline earth metal compound, adding yeast and maintaining conditions conducive to yeast propagation.

2. In the process of making bakers' yeast with the use of waste water as a yeast nutrient, the steps which consist in growing yeast cells in a mash solution containing sugar, to which has been added a yeast food composed of waste water, the latter being the remaining product after calcium sucrate, formed by the addition of lime to beet molasses, is filtered out.

3. In a manufacture of yeast with the use of waste water as a yeast nutrient, the process of treating a mash for the reception of yeast, which mash contains yeast assimilable nitrogenous material, by increasing the proportion of such nitrogenous material by adding to the mash beet waste water containing beet extractive matter and which waste water is produced in the desugarizing of a beet sugar containing liquid when sugar is removed therefrom as an alkaline earth metal saccharate by addition of an alkaline earth metal compound.

4. In the manufacture of yeast with the use of waste water as a yeast nutrient, the process of treating a mash for the reception of yeast, which mash contains amino nitrogen nitrogenous material, increasing the amount of the amino nitrogenous material by adding to the mash a quantity of the waste water containing beet extractive matter and which waste water is produced in the desugarizing of a beet sugar containing liquid when sugar is removed therefrom as an alkaline earth metal saccharate by addition of an alkaline earth metal compound until the ratio of the sugar to amino nitrogen present in the mash is in the ratio of 100 parts of sugar to at least 0.4 of a part of amino nitrogen.

5. In the manufacture of yeast with the use of waste water as a yeast nutrient, the process of treating a mash for the reception of yeast which mash contains sugar and yeast assimilable nitrogenous material, increasing the proportion of such nitrogenous material by adding to the mash a quantity of the waste water produced in the desugarizing of a beet sugar containing liquid when sugar is removed therefrom as an alkaline earth metal saccharate by addition of an alkaline earth metal compound until the ratio of the sugar to such nitrogenous material present in the mash is in the ratio of 100 parts of sugar to at least 0.4 of a part of nitrogenous material in the form of amino nitrogen.

6. In the manufacture of yeast with the use of waste water as a yeast nutrient, the process of treating a mash for the reception of yeast which mash contains sugar, providing the mash with yeast assimilable nitrogenous material by adding a quantity of waste water produced in the desugarizing of a beet sugar containing liquid when sugar is removed therefrom as an alkaline earth metal saccharate by addition of an alkaline earth metal compound.

7. In the manufacture of yeast with the use of waste water as a yeast nutrient, the process of treating a liquid mash prepared from cane sugar molasses or syrup to increase the proportion of yeast assimilable organic nitrogenous matter with respect to the sugar content, which process includes the addition of a quantity of waste water resultant of the desugarizing of a beet sugar containing liquid when sugar is removed therefrom as an alkaline earth metal saccharate by addition of an alkaline earth metal compound.

8. In the manufacture of living ferments with the use of waste water as a nutrient for the ferment, the process of treating a mash made from sugar cane material for the reception of a culture of the ferment, which process includes the addition to such a mash which has been previously prepared, a quantity of waste water resultant from the desugarizing of beet molasses when sugar is removed therefrom as an alkaline earth metal saccharate by addition of an alkaline earth metal compound.

9. The process of preparing yeast with the use of waste water as a yeast nutrient, which process consists in preparing a yeast nutrient containing sugar and yeast assimilable nitrogenous matter and consisting of waste water resulting from the desugarizing of beet molasses when sugar is removed therefrom as an alkaline earth metal saccharate by addition of an alkaline earth metal compound, preparing a mash for the reception of yeast, adding said nutrient to said mash, incorporating seed yeast to the mash mixture, and growing the yeast in the mash.

In testimony whereof I affix my signature.

HENRY W. DAHLBERG.